(12) United States Patent
Suzuki et al.

(10) Patent No.: US 10,072,560 B2
(45) Date of Patent: Sep. 11, 2018

(54) PRECOMBUSTION-CHAMBER FUEL SUPPLY DEVICE FOR GAS INTERNAL COMBUSTION ENGINE

(71) Applicant: Mitsubishi Heavy Industries, Ltd., Tokyo (JP)

(72) Inventors: Hajime Suzuki, Tokyo (JP); Hiroshi Yoshizumi, Tokyo (JP)

(73) Assignee: Mitsubishi Heavy Industries Engine & Turbocharger, Ltd., Kanagawa (JP)

( * ) Notice: Subject to any disclaimer, the term of this patent is extended or adjusted under 35 U.S.C. 154(b) by 287 days.

(21) Appl. No.: 14/777,453

(22) PCT Filed: Feb. 19, 2014

(86) PCT No.: PCT/JP2014/053836
§ 371 (c)(1),
(2) Date: Sep. 15, 2015

(87) PCT Pub. No.: WO2014/148177
PCT Pub. Date: Sep. 25, 2014

(65) Prior Publication Data
US 2016/0010538 A1    Jan. 14, 2016

(30) Foreign Application Priority Data

Mar. 19, 2013    (JP) .................................. 2013-056774

(51) Int. Cl.
*F02B 19/12*    (2006.01)
*F02B 19/10*    (2006.01)
(Continued)

(52) U.S. Cl.
CPC .......... *F02B 19/12* (2013.01); *F02B 19/1085* (2013.01); *F02D 19/024* (2013.01);
(Continued)

(58) Field of Classification Search
CPC ............ F02M 21/0242; F02M 21/0275; F02B 19/12; F02B 19/1085; F02B 19/1052; F02D 19/024
See application file for complete search history.

(56) References Cited

U.S. PATENT DOCUMENTS 6,354,263 B2 *    3/2002   Ibrahim   ................ F02B 17/005
                                                          123/261
6,390,053 B2 *    5/2002   Gillis    ...................... F02B 19/12
                                                          123/253
(Continued)

FOREIGN PATENT DOCUMENTS

CN         101289062 A      10/2008
CN         102575589 A       7/2012
(Continued)

OTHER PUBLICATIONS

Translation of JP2007270782, Sep. 26, 2017.*
(Continued)

*Primary Examiner* — Erick Solis
*Assistant Examiner* — Anthony L Bacon
(74) *Attorney, Agent, or Firm* — Berkeley Law & Technology Group, LLP

(57) ABSTRACT

An object is to provide a precombustion-chamber fuel supply device for a precombustion-chamber gas engine having high reliability and low operation cost by reducing outflow of fuel gas to the precombustion chamber in the exhaust stroke and dispersion of the amount of fuel gas supplied to the cylinders, which makes it possible to cut fuel consumption and to achieve stable combustion. A gas internal combustion engine of a Miller-cycle type includes: a main chamber 60 defined between a piston and a cylinder head 1; a precombustion chamber 4 which communicates with the main chamber 60 via a nozzle 3 and in which fuel gas is combusted by a spark plug 10; a gas supply channel
(Continued)

to precombustion chamber 14 for supplying the fuel gas to the precombustion chamber 4; and a check valve 6 disposed in the gas supply channel to precombustion chamber 14 and configured to open due to a pressure decrease in the precombustion chamber 4 at a BDC of an intake stroke of a Miller cycle in which the piston closes an intake valve before the BDC of the intake stroke so as to allow supply of the fuel gas to the precombustion chamber 4.

6 Claims, 3 Drawing Sheets

(51) Int. Cl.
*F02M 21/02* (2006.01)
*F02D 19/02* (2006.01)

(52) U.S. Cl.
CPC .... *F02M 21/0242* (2013.01); *F02M 21/0275* (2013.01); *Y02T 10/125* (2013.01); *Y02T 10/142* (2013.01); *Y02T 10/32* (2013.01)

(56) References Cited

U.S. PATENT DOCUMENTS

| | | | | |
|---|---|---|---|---|
| 6,575,192 B1* | 6/2003 | Shaffer | ............ | F02B 19/12 |
| | | | | 137/514.5 |
| 8,757,127 B2* | 6/2014 | Ishida | ............ | F01P 3/16 |
| | | | | 123/254 |
| 9,528,463 B2* | 12/2016 | Stoll | ............ | F02D 41/22 |
| 2008/0257301 A1 | 10/2008 | Hotta et al. | | |
| 2011/0214639 A1* | 9/2011 | Ishida | ............ | F01P 3/16 |
| | | | | 123/275 |
| 2012/0279218 A1 | 11/2012 | Ishida et al. | | |

FOREIGN PATENT DOCUMENTS

| | | | |
|---|---|---|---|
| EP | 2372135 | A1 | 10/2011 |
| JP | 2003278548 | A | 10/2003 |
| JP | 2006170142 | A | 6/2006 |
| JP | 2007270782 | A | 10/2007 |
| JP | 2009221935 | A | 10/2009 |
| JP | 2009299593 | A | 12/2009 |
| JP | 2010074273 | A1 | 7/2010 |
| JP | 2010150983 | A | 7/2010 |
| JP | 2010265835 | A | 11/2010 |
| JP | 2010265836 | A | 11/2010 |
| JP | 2011149308 | A | 8/2011 |
| WO | 2010074273 | A1 | 7/2010 |
| WO | 2014148177 | A1 | 9/2014 |

OTHER PUBLICATIONS

Decision to Grant a Patent, App. No. JP2013-056774, Drafting Date Aug. 29, 2016, 6 Pages.
EPO, Extended European Search Report, Appl. No. 14771002.4, dated Apr. 29, 2016, 7 Pages.
Office Action, App No. JP2013-056774, dated May 20, 2016, 10 Pages.
Notification Concerning Submission, Obtention or Transmittal of Priority Document, App. No. PCT/JP2014/053836, Filed Feb. 19, 2014, dated Apr. 10, 2014, 1 Page.
First Office Action, Chinese App. No. 201480016327.6, dated Apr. 1, 2017, 12 Pages.
Notification Concerning Transmittal of International Preliminary Report on Patentability, App. No. PCT/JP2014/053836, Filed Feb. 19, 2014, dated Oct. 1, 2015, 11 Pages.
International Search Report, App. No. PCT/JP2014/053836, Filed Feb. 19, 2014, dated Apr. 15, 2014, 11 Pages.
Office Action, EP App. No. 14771002.4, dated Nov. 7, 2017, 5 Pages.

* cited by examiner

PRECOMBUSTION-CHAMBER FUEL SUPPLY DEVICE FOR GAS INTERNAL COMBUSTION ENGINE

TECHNICAL FIELD

The present invention relates to a precombustion-chamber type gas engine including a precombustion chamber to which gas fuel is supplied and a main combustion chamber into which intake-air mixed gas is introduced.

BACKGROUND

In addition to a normal combustion chamber called a main chamber, a precombustion-chamber type lean premixed gas internal combustion engine (hereinafter, referred to in short as a "gas engine") includes a combustion chamber communicating with the main chamber via a nozzle, which is referred to as a precombustion chamber.

An intake valve is opened during an intake stroke to introduce lean mixed gas into the main chamber and combustion gas into the precombustion chamber, and mixed gas is produced by mixing the lean mixed gas that flowed into the precombustion chamber from the main chamber via the nozzle during a compression stroke and the fuel gas supplied to the precombustion chamber during the intake stroke.

The produced mixed gas is combusted by an ignition spark of a spark plug disposed in the precombustion chamber, and a flame is injected into the lean mixed gas in the main combustion chamber from the precombustion chamber via the nozzle.

This flame is injected into the lean mixed gas in the main combustion chamber to perform main combustion.

According to Patent Document 1, an engine includes a main chamber facing a piston and a precombustion chamber communicating with the main chamber via a nozzle as combustion chambers. The engine further includes a precombustion-chamber fuel supply channel for supplying fuel gas to the precombustion chamber and the first check valve which is disposed in the precombustion-chamber fuel supply channel and which opens due to a pressure decrease in the precombustion chamber to allow supply of fuel gas to the precombustion chamber.

A branch channel is formed on the precombustion-chamber fuel supply channel between the first check valve and the precombustion chamber at an end portion on a downstream side. The branch channel includes the second check valve which opens due to a pressure increase in the precombustion chamber to allow gas to flow in from the precombustion-chamber fuel supply channel.

With the above structure, the first check valve opens while the second check valve is maintained to be closed upon a pressure decrease in the precombustion chamber. Thus, it is possible to supply fuel gas to the precombustion chamber.

When a pressure in the precombustion chamber increases, the second check valve opens while the first check valve is maintained to be closed. Thus, the fuel gas having been prevailing in the precombustion-chamber fuel supply channel at the downstream side of the first check valve flows into the branch channel.

In this way, when ignition takes place in the precombustion chamber and the mixed air is combusted, the pressure in the precombustion chamber increases and the second check valve opens.

As a result, the combusted gas in the precombustion chamber flows into the precombustion-chamber fuel supply channel, and the non-combusted gas having been compressed in the precombustion-chamber fuel supply channel flows into the branch channel. Thus, the precombustion-chamber fuel supply channel between the first check valve and the precombustion chamber is filled with the combusted gas. In an expansion stroke, a pressure in the precombustion chamber decreases due to descent of the piston and the second check valve closes, so that the gas in the precombustion-chamber fuel supply channel at the downstream side of the first check valve gradually flows out into the combustion chamber. Here, the precombustion-chamber fuel supply channel at the downstream side of the first check valve is filled with the combusted gas, which makes it possible to prevent non-combusted gas from flowing out into the combustion chamber.

Accordingly, Patent Document 1 discloses reducing the amount of discharge of non-combusted gas in the next exhaust stroke after the expansion stroke to improve engine efficiency.

CITATION LIST

Patent Literature

Patent Document 1: JP2009-299593A

SUMMARY

Problems to be Solved

However, according to Patent Document 1, the first check valve which opens due to a pressure decrease in the precombustion chamber to allow fuel gas to be supplied to the precombustion chamber is provided.

While Patent Document 1 describes that the first check valve opens when a pressure decreases to allow fuel gas to be supplied to the precombustion chamber, a check valve is originally designed to be opened or closed by a pressure difference between the upstream side and the downstream side.

Accordingly, in Patent Document 1, the in-cylinder pressure becomes the lowest in the intake stroke and the exhaust stroke.

Thus, there is a problem that a differential pressure between the inside of the precombustion-chamber fuel supply channel and the inside of the precombustion chamber is generated in the first check valve and fuel gas is supplied to the precombustion chamber also in the exhaust stroke, thereby wasting the fuel gas.

Further, in the combustion stroke, the second check valve opens when the pressure in the combustion chamber increases so that the combustion gas is discharged. Thus, there is a problem that the output of the gas engine decreases, because the gas engine extracts power from a pressure of the combustion gas.

The present invention was made in view of the above issues to provide a precombustion-chamber fuel supply device for a precombustion-chamber gas engine having high reliability and low operation cost by reducing outflow of fuel gas to the precombustion chamber in the exhaust stroke and dispersion of the amount of fuel gas supplied to the cylinders, which makes it possible to cut fuel consumption and to achieve stable combustion.

Solution to Problems

A precombustion-chamber fuel supply device for a gas internal combustion engine of a Miller-cycle type according to the present invention includes: a main chamber defined between a piston and a cylinder head of the gas internal combustion engine; a precombustion chamber which communicates with the main chamber via a nozzle and in which fuel gas is combusted by a spark plug; a gas supply channel to precombustion chamber for supplying the fuel gas to the precombustion chamber; and a check valve disposed in the gas supply channel to precombustion chamber and configured to open due to a pressure decrease in the precombustion chamber at a bottom dead center of an intake stroke of a Miller cycle in which the piston closes an intake valve before the bottom dead center of the intake stroke so as to allow supply of the fuel gas to the precombustion chamber.

According to the above invention, during an intake stroke of the piston, the intake valve is closed before the dead bottom center. In this way, a pressure decrease is caused by the further descent of the piston, so that the check valve opens and the fuel gas is supplied to the precombustion chamber.

Further, since the pressure decrease is caused by closure of the valve and the amount of movement of the piston, the pressure becomes constant and dispersion of the amount of fuel gas supply to the precombustion chamber is reduced, which makes it possible to achieve stable combustion of the gas engine.

Specifically, if the fuel gas is supplied to the precombustion chamber while being pressurized, a large amount of fuel gas is likely to be supplied to the precombustion chamber at the moment when the check-valve opens. As a result, due to multiple causes including supply-pressure fluctuation of a supply pump and a difference in flow resistance of fuel gas caused by the distance from the supply pump to each cylinder or the like, dispersion is likely to occur in the amount of fuel gas supply to each cylinder. The present invention makes the above event unlikely to occur.

Further, preferably in the present invention, the check valve may include a valve body, a valve seat against which the valve body is pressed and which forms a seal portion, and an elastic member which presses the valve body against the seal portion, and a pressing force W of the elastic member may be within a range of a following expression (1):

$$Q2 \times Sa - Q1 \times Sb > W$$

where Q1 is a gas pressure in the precombustion chamber at the bottom dead center in the intake stroke; Q2 is a fuel-gas pressure of the gas supply channel to precombustion chamber; Sa is a fuel-gas pressure receiving area of the valve body; and Sb is a precombustion-chamber gas pressure receiving area of the valve body.

According to the above invention, the pressing force W of the elastic member is smaller than a difference between a product of Q2, the fuel-gas pressure of the gas supply channel to precombustion chamber, and Sa, the fuel-gas pressure receiving area of the valve body on a side closer to the precombustion-chamber supply channel, and a product of Q1, the gas pressure in the precombustion chamber at the bottom dead center in the intake stroke, and Sb, the precombustion-chamber gas pressure receiving area of the valve body.

In this way, the check valve is opened by the pressure decrease in the precombustion chamber at the bottom dead center in the intake stroke of the Miller cycle, which makes it possible to reduce the supply pressure of the fuel gas.

Thus, it is possible to reduce the supply pressure of the fuel gas, which reduces dispersion of the amount of fuel-gas supply to each cylinder and enables stable combustion of the gas engine.

Further, preferably in the present invention, the fuel gas pressure of the gas supply channel to precombustion chamber may be set to be lower than the gas pressure in the precombustion chamber in an exhaust stroke.

According to the above invention, the fuel gas pressure of the gas supply channel to precombustion chamber is set to be lower than the gas pressure in the precombustion chamber in an exhaust stroke, and is applied in a direction in which the check-valve is closed in the exhaust stroke. Thus, it is possible to restrict the fuel gas from flowing into the precombustion chamber during the exhaust stroke and to prevent outflow of the fuel gas in the exhaust stroke.

Advantageous Effects

With the above configuration, it is possible to reduce outflow of fuel gas to the precombustion chamber in the exhaust stroke and dispersion of the amount of fuel gas supply to the cylinders, which makes it possible to cut fuel consumption and achieve stable combustion. As a result, it is possible to provide a precombustion-chamber fuel supply device for a precombustion-chamber gas engine having high reliability and low operation cost.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

Figure 1:
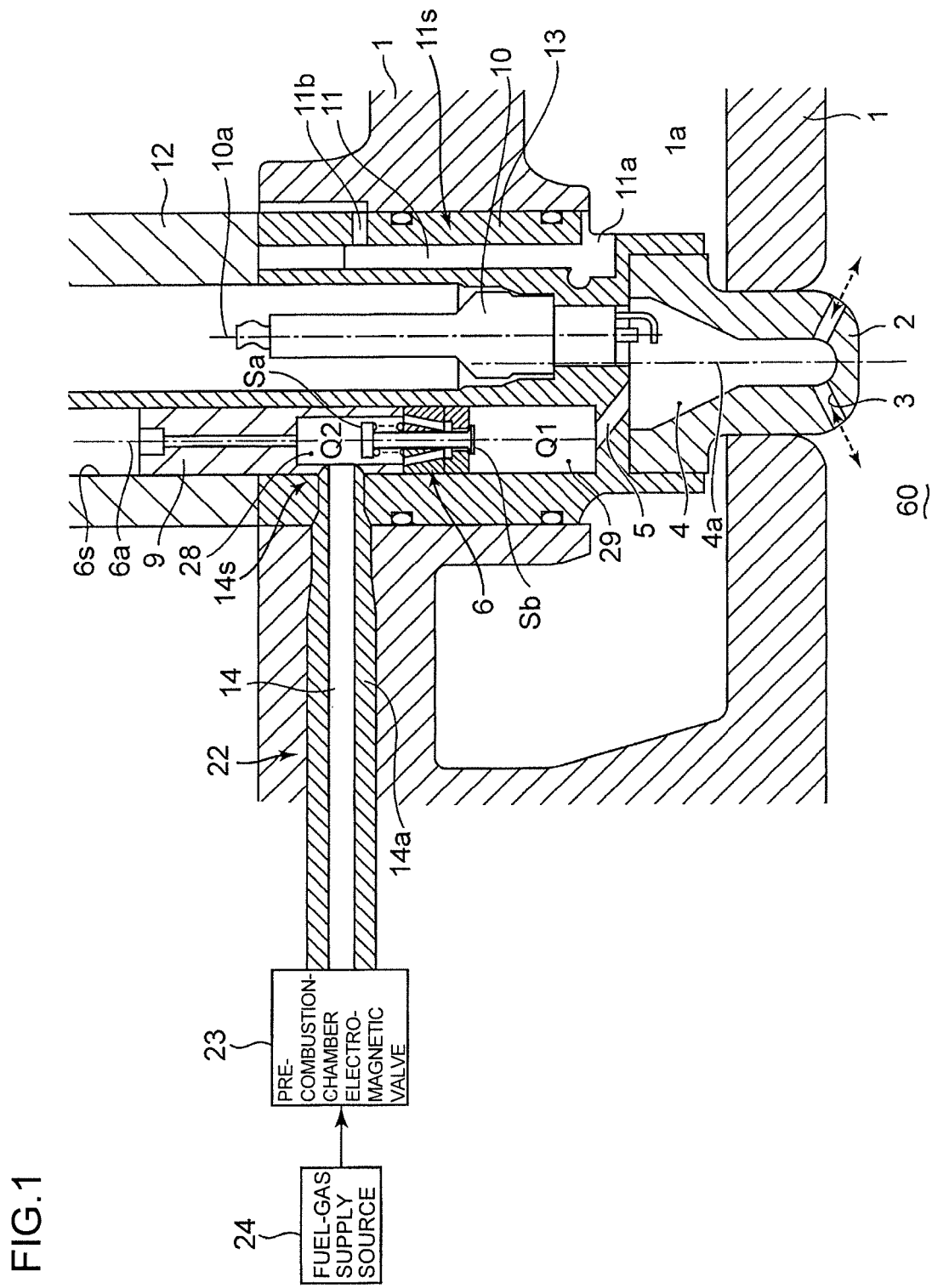
FIG. 1 is a schematic cross-sectional view of a precombustion chamber and its peripheral structure of a gas engine according to one embodiment of the present invention.

FIG. 1 is a schematic cross-sectional view of a precombustion chamber and its peripheral structure of a gas engine according to one embodiment of the present invention.

In FIG. 1, a main chamber 60 being a main combustion chamber is defined between a piston (not illustrated) and a cylinder head 1. Further, a precombustion-chamber cap 2 is fixed to an upper part of the cylinder head 1, surrounded by a coolant water channel 1a. A precombustion chamber 4 is formed inside the precombustion-chamber cap 2 ("4a" indicates the center of the precombustion chamber 4). The precombustion chamber 4 communicates with the main chamber 60 via nozzles 3.

Further, the precombustion-chamber cap 2 is pressed by an ignition-plug holder 13 and a retainer 12 at a precombustion-chamber upper surface at the upper part of the precombustion-chamber cap 2, so as to be fixed to the cylinder head 1. A spark plug 10 is fixed inside the ignition-plug holder 13 via an attachment seat surface.

Further, as illustrated in FIG. 1, a bore-cooling coolant hole 11s and a check-valve insertion hole 6s are formed in the ignition-plug holder 13 around the precombustion chamber 4. The bore-cooling coolant hole 11s is configured such that a lower bore-cooling side hole 11a (inlet hole) communicates to an upper bore-cooling side hole 11b (outlet hole) via a plurality of bore-cooling vertical holes (vertical coolant holes) 11 that is parallel to an axial center line 10a of the spark plug 10, so as to surround a high-temperature section of the spark plug 10.

Further, the check-valve insertion hole 6s is disposed so that the center 6a of the check-valve insertion hole 6s is parallel to the center line 10a of the spark plug 10, and a check valve 6 supported by a check-valve holder 9 is disposed at the lower part of the check-valve insertion hole 6s. With the check valve 6 being provided, the inside of the check-valve insertion hole 6s is divided into two spaces: a check-valve upper chamber 28 and a check-valve lower chamber 29. The check-valve lower chamber 29 and the precombustion chamber 4 are in communication through a gas supply hole to precombustion chamber 5.

Further, an end of a fuel-inlet connector 14a is connected to a side of the ignition-plug holder 13, so that a gas supply channel to precombustion chamber 14 formed inside the fuel-inlet connector 14a communicates with the ignition-plug holder 13. The fuel-inlet connector 14a is formed as a separate member from the ignition-plug holder 13, and screwed to the ignition-plug holder 13 to be fixed to the fuel-gas inlet part 14s.

Further, the other end of the fuel-inlet connector 14a is connected to a fuel-gas supply source 24 via a precombustion-chamber electromagnetic valve 23. The fuel-gas supply source 24 is configured to discharge the fuel gas to the gas supply channel to precombustion chamber 14 at a substantially constant pressure. In the present embodiment, the discharge pressure is an atmospheric pressure.

The precombustion-chamber electromagnetic valve 23 is configured such that a valve body normally biased toward a valve-closed direction by a spring or the like resists the spring force to operate toward a valve-open direction when a solenoid part is excited by supply of power. Further, the precombustion-chamber electromagnetic valve 23 is configured such that the valve body operates toward the valve-closed direction with the spring force when the power supply is stopped. Input of an opening/closing signal to the precombustion-chamber electromagnetic valve 23, i.e., on/off of power supply is controlled on the basis of a signal of a crank-angle sensor (not illustrated).

In the precombustion-chamber gas supply device for a gas engine of the present embodiment having the above configuration, when a valve-opening signal is inputted to the precombustion-chamber electromagnetic valve 23 connected to the fuel-gas supply source 24, the solenoid part is excited and the valve body moves to be open, so that the fuel gas flows out to the combustion-chamber gas supply channel 14 from the fuel-gas supply source 24. The fuel gas having flowed out flows into the check-valve upper chamber 28 via a fuel-gas inlet part 14s, and then to the precombustion chamber 4 from the check-valve lower chamber 28 via the gas supply hole to precombustion chamber 5. That is, the gas supply channel to precombustion chamber for supplying fuel gas to the precombustion chamber 4 is constituted by the above precombustion-gas supply channel 14, the check-valve upper chamber 28, the check-valve lower chamber 29, and the gas supply hole to precombustion chamber 5.

In the present embodiment, the precombustion-chamber electromagnetic valve 23 is disposed between the fuel-gas supply source 24 and the check-valve upper chamber 28. In this way, the precombustion-chamber electromagnetic valve 23 functions as a safety valve when fuel gas leaks at the check valve 6 or the like during shutdown or the like of the gas engine.

Further, the precombustion-chamber electromagnetic valve 23 has a pressure-adjustment function, which makes it possible to stabilize the gas discharge pressure (atmospheric pressure) to the check-valve upper chamber 28, and to reduce dispersion of the amount of fuel gas supply to the precombustion chamber 4 as the fuel gas passes through the precombustion-chamber electromagnetic valve 23.

Figure 2:
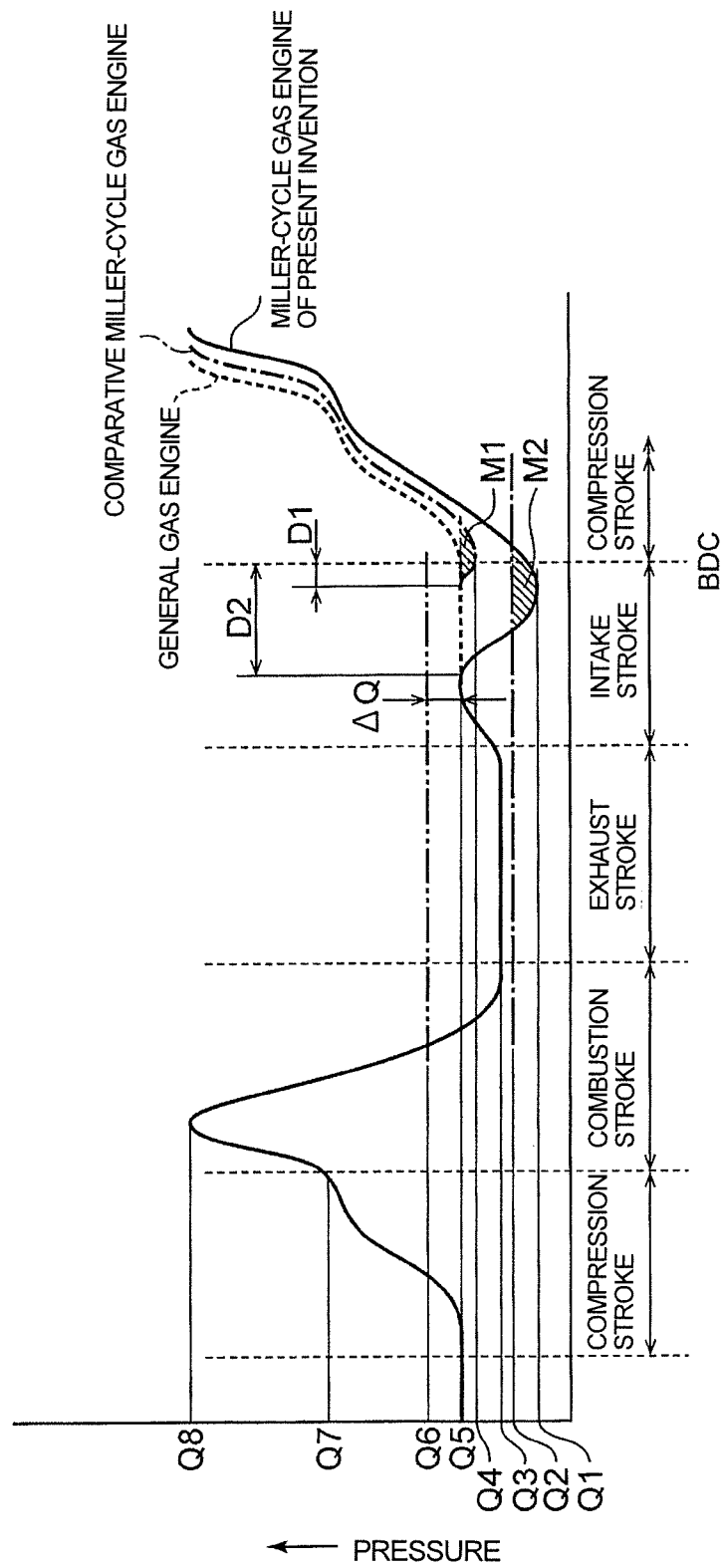
FIG. 2 is a comparison chart of fuel-gas supply pressure of a gas engine according to one embodiment of the present invention.

FIG. 2 is an old-and-new comparison chart of fuel-gas supply pressure of a gas engine according to one embodiment of the present invention.

The vertical axis is the in-cylinder pressure of the gas engine, which is the capacity for supplying fuel gas to the precombustion chamber. The horizontal axis is the stroke of the piston accompanying the rotation of the gas engine.

Here, the in-cylinder pressure is a pressure including the main chamber 60 and the precombustion chamber 4 which communicates with the main chamber 60 via the nozzles 3.

The in-cylinder pressure is increased by compression of lean mixed gas introduced into the main chamber 60 from an intake device, in accordance with the progress in the compression stroke of the piston.

When the piston reaches the vicinity of the top dead center (hereinafter, referred to as TDC) (in-cylinder pressure Q7), the thick fuel gas in the precombustion chamber 4 and the lean fuel gas flowing into the precombustion chamber 4 from the main chamber 60 via the nozzles 3 are mixed and combusted by the spark plug 10 of the precombustion chamber. The combusted flame blows out into the main chamber 60 via the nozzles 3, and the process advances to a combustion stroke in which the lean fuel gas in the main chamber 60 is combusted (exploded).

In accordance with the combustion, the pressure in the combustion chamber increases rapidly, so as to reach the maximum in-cylinder pressure Q8 when the piston has passed the TDC. The piston starts to descend while receiving a combustion pressure, so as to be outputted as a rotation output by the rotation of the crank shaft (not illustrated).

The piston continues descending to reach a bottom dead center (hereinafter, referred to as BDC), and then the piston enters an ascending stroke again, i.e., an exhaust stroke of exhaust gas produced by combustion of the lean mixed gas.

When the exhaust gas is emitted into the ambient air via an exhaust channel, flow resistance of exhaust gas is caused in the exhaust channel or the like. Thus, even though the exhaust gas is emitted while the piston ascends, the in-cylinder pressure (exhaust gas) is maintained to have a pressure Q3 which is higher than the atmospheric pressure.

When the piston comes to the TDC passing position again, the exhaust valve closes. On the other hand, the intake valve opens before the piston passes the TDC, and then the piston starts to descend again to enter the intake stroke.

At this point of time, a normal gas engine would have a fuel-gas supply pressure Q6 supplied to the precombustion chamber 4.

The in-cylinder pressure is Q3 during the exhaust stroke of the piston increases to Q5 in the intake stroke due to incorporation of the lean mixed gas (dotted line in FIG. 2). Subsequently, the piston enters the compression stroke and the in-cylinder pressure increases.

In a normal gas engine, a required amount of fuel gas may not enter the precombustion chamber 4 if the supply pressure $Q6$ of the fuel gas is not maintained to be higher than the pressure of the lean mixed gas flowing into the main chamber 60.

Thus, a differential pressure $\Delta Q$ is set between the fuel-gas supply pressure $Q6$ supplied to the precombustion chamber 4 and the in-cylinder pressure $Q5$ in the intake stroke, so that it is possible to supply fuel gas to the precombustion chamber 4.

When the check valve opens while the in-cylinder pressure is $Q5$, the fuel gas gets forced into the precombustion chamber 4 by the pressure and the amount of supply tends to increase, and the amount of fuel gas supply to the precombustion chamber 4 is likely to become unbalanced.

Furthermore, during the exhaust stroke, the fuel-gas supply pressure $Q6$ is higher than the in-cylinder pressure $Q3$ in the exhaust stroke. Thus, the fuel gas flows into the precombustion chamber 4 to be discharged from the gas engine to the outside as non-combusted gas, thereby producing wasted fuel.

In a Miller-cycle type gas engine of a comparative example, the in-cylinder pressure $Q3$ in the exhaust stroke of the piston increases to the in-cylinder pressure $Q5$ when the piston enters the intake stroke.

However, a Miller-cycle type gas engine has a structure in which the piston descends in the intake stroke and an intake valve for introducing lean mixed gas is closed at D1 (e.g. approximately 40 degrees in crank angle) before BDC.

After the intake valve is closed, the piston still descends toward the BDC and the inflow of the lean mixed gas is ceased. Thus, the in-cylinder pressure becomes $Q4$ at D1 before the BDC in the intake stroke, causing a pressure decrease of the lean mixed gas (single-dotted chain line in FIG. 2) represented as M1.

However, after the intake valve is closed, the amount of decompression in the in-cylinder pressure $Q5$-$Q4$ (M1) is small because the amount of movement of the piston toward the BDC is small. Further, the fuel-gas supply pressure $Q6$ is higher than the in-cylinder pressure $Q3$ in the exhaust stroke.

It is necessary to generate a differential pressure between the precombustion chamber 4 side and the gas supply channel to precombustion chamber 14 side by setting the supply pressure of the fuel gas supplied to the precombustion chamber 4 at $Q6$ which is a fuel gas supply pressure higher than the in-cylinder pressure $Q3$.

Accordingly, the fuel gas is supplied to the precombustion chamber 4 with a differential pressure of $\Delta Q$, and thus a large amount of fuel gas is likely to be supplied to the precombustion chamber at the moment when the check valve opens. As a result, due to multiple causes including supply-pressure fluctuation of a supply pump and a difference in flow resistance of fuel gas caused by the distance from the supply pump to each cylinder or the like, dispersion is likely to occur in the amount of fuel gas supply to each cylinder.

In the Miller-cycle type gas engine of the comparative example, in the exhaust stroke, the fuel supply pressure $Q6$ is higher than the in-cylinder pressure $Q3$ in the exhaust stroke. Thus, the fuel gas flows to the precombustion chamber 4 to be discharged as non-combusted gas to the outside from the gas engine, thereby producing wasted fuel.

The Miller-cycle type gas engine according to the present embodiment of the present invention has a structure in which the piston descends in the intake stroke and an intake valve for introducing lean mixed gas is closed at D2 (e.g. approximately 60 to 120 degrees in crank angle) before the BDC.

After the intake valve is closed, the piston still descends toward the BDC and the inflow of the lean mixed gas is ceased.

The in-cylinder pressure $Q1$ decreases in the intake stroke (solid line in FIG. 2).

Accordingly, the in-cylinder pressure decreases considerably (M2) downward (decompression direction) as indicated by the solid line from the middle of the intake stroke. The precombustion chamber communicating with the main chamber reaches the same pressure as the in-cylinder pressure.

The time of closing the intake valve is further advanced from the BDC, which reduces the lean mixed gas introduced into the cylinder. Further, the period (amount of stroke) from the point of time when the intake valve is closed to the BDC is increased, which causes the in-cylinder pressure to become a negative pressure.

In the present embodiment, the time of closing the intake valve is advanced before the BDC to reduce the pressure of the lean mixed gas in the main chamber 60 and the precombustion chamber 4.

Further, it is possible to reduce the fuel-gas supply pressure $Q2$ in the gas supply channel to precombustion chamber 14 along the pressure $Q1$ of the lean mixed gas of the precombustion chamber 4.

Then, the time of closing the intake valve is set so that the pressure $Q1$ of the lean mixed gas of the main chamber 60 and the precombustion chamber 4 becomes a pressure lower than the fuel gas supply pressure $Q2$ in the gas supply channel to precombustion chamber 14.

In the present embodiment, the fuel gas supply pressure $Q2$ in the gas supply channel to precombustion chamber 14 is not pressurized but used as a substantially atmospheric pressure.

As a result, as described above, the in-cylinder pressure is higher than the atmospheric pressure in the exhaust stroke.

Accordingly, the fuel gas supply pressure $Q2$ in the gas supply channel to precombustion chamber 14 is lower than the in-cylinder pressure $Q3$ in the exhaust stroke.

Accordingly, in the period having an in-cylinder pressure lower than the fuel gas supply pressure $Q2$ (shaded areas in FIG. 2) the check valve opens and the fuel gas in the gas supply channel to precombustion chamber 14 is sucked into the precombustion chamber 4.

The differential pressure between the check-valve upper chamber 28 and the precombustion chamber 4 is caused by the amount of movement of the piston after closure of the intake valve. Thus, dispersion in the generated differential pressure is small, which in accordance decreases dispersion of the amount of fuel gas supply to the precombustion chamber 4. Thus, rotation of the gas engine becomes stable.

Further, the check valve 6 receives a pressure in the closing direction because, in the exhaust stroke, the fuel supply pressure $Q2$ is lower than the in-cylinder pressure $Q3$ in the exhaust stroke.

Accordingly, the fuel gas does not flow to the precombustion chamber 4, which makes it possible to prevent leakage of the fuel gas in the exhaust stroke.

The check valve 6 opens due to a pressure decrease caused by closure of the intake valve by the piston at D2 before the BDC in the intake stroke so as to allow supply of the fuel gas to the precombustion chamber.

Specifically, the check valve 6 is configured to be securely operated by a differential pressure between the lean mixed gas pressure $Q1$ of the precombustion chamber 4 and the fuel gas supply pressure $Q2$ (the check-valve upper chamber 28) in the gas supply channel to precombustion chamber 14.

Figure 3:
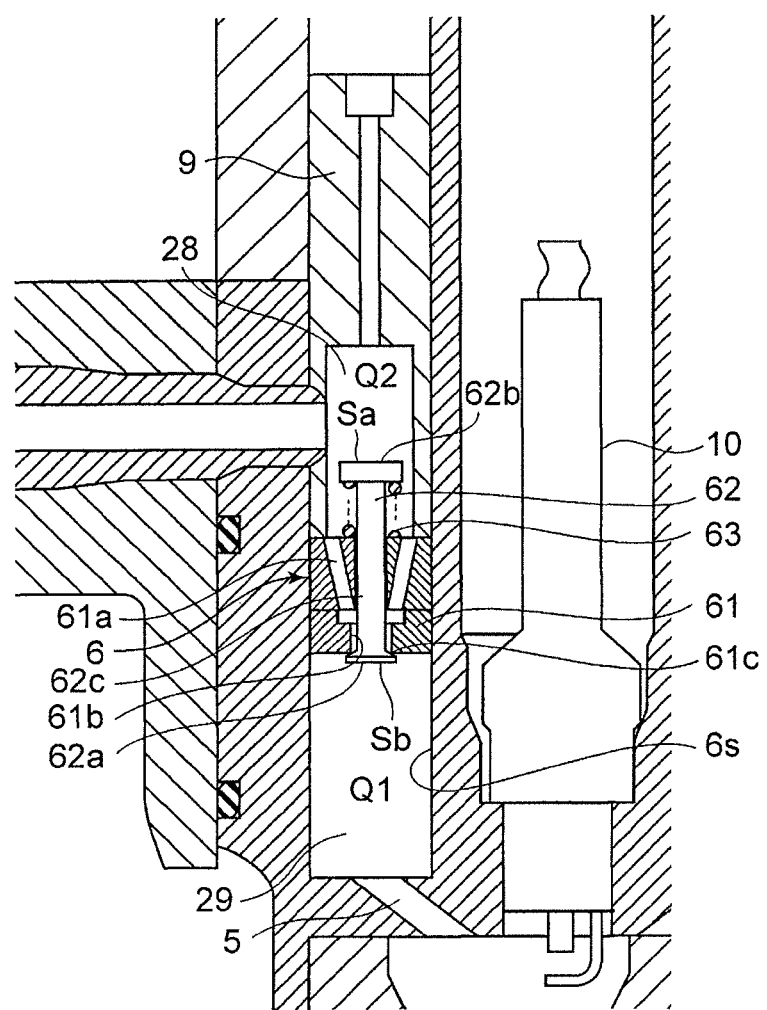
FIG. 3 is an enlarged view of a check valve of a gas engine according to one embodiment of the present invention.

The check valve 6 will be described with reference to FIG. 3.

The check valve 6 includes a check-valve body 61, a valve body 62 mounted to a center shaft portion of the check-valve body 61 through the check-valve body 61, and a coil spring 63 which is an elastic member that presses the valve body 62 against a seal portion 61c disposed on the check-valve body 61 so as to face the check-valve lower chamber 29.

The check-valve body 61 includes a through hole 61b, a plurality of communication channels 61a, and a seal portion 61c. The through hole 61b penetrates through the center of the check-valve body 61 from the check-valve upper chamber 28 to the check-valve lower chamber 29 along the axis of the check-valve body 61. The plurality of communication channels 61a communicate with the through hole 61b in the vicinity of a side of the through hole 61b adjacent to the check-valve lower chamber 29 and have openings adjacent to the check-valve upper chamber 28. The plurality of communication channels 61a is disposed outside of the outer periphery of the through hole 61b.

The valve body 62 includes a column portion 62c fitted into the through hole 61b, a valve-body top portion 62a that has a shape of an umbrella, and a stopper portion 62b. The valve-body top portion 62a is formed on the column portion 62c adjacently to the check-valve lower chamber 29 and is in contact with the seal portion 61c so as to prevent fuel gas from flowing from the check-valve upper chamber 28 toward the check-valve lower chamber 29. The stopper portion 62b is formed on the column portion 62c adjacently to the check-valve upper chamber 28 so as to retain the coil spring 63 fitted onto the outer circumferential part of the column portion 62c in a compressed state between the check-valve body 61 and the stopper portion 62b.

Valve-opening operation of the check-valve 6 is adjusted as follows.

The spring pressing force W satisfies:

$$Q2 \times Sa - Q1 \times Sb > W$$

where Q1 is a gas pressure in the precombustion chamber 4 at the bottom dead center in the intake stroke; Q2 is a fuel-gas pressure of the gas supply channel to precombustion chamber 14; Sa is a fuel-gas pressure receiving area of the valve body 62; and Sb is a precombustion-chamber gas pressure receiving area of the valve body 62.

The pressing force W of the coil spring 63 is set to be lower than a difference of; a product of the fuel gas pressure Q2 of the gas supply channel to precombustion chamber 14 and the fuel-gas pressure receiving area Sa of the stopper portion 62b; and a product of the gas pressure Q1 in the precombustion chamber 4 at the BDC in the intake stroke and the gas pressure receiving area Sb of the valve-body top portion 62a of the valve body 62. In this way, the valve-opening pressure of the check valve 6 is reduced so that fuel gas is not supplied to the precombustion chamber 4 unnecessarily.

Further, the gas pressure P2 in the precombustion chamber 4 at the bottom dead center in the intake stroke is a pressure decrease caused by closure of the intake valve at D2 before the BDC and the amount of movement of the piston. Thus, the pressure becomes constant and dispersion of the amount of fuel gas supply (introduction amount) from the gas supply channel to precombustion chamber 14 to the precombustion chamber 4 is reduced, which makes it possible to achieve stable combustion of the gas engine.

With the above configuration, it is possible to reduce outflow of fuel gas to the precombustion chamber in the exhaust stroke and dispersion of the amount of fuel gas supply to the cylinders, which makes it possible to cut fuel consumption and achieve stable combustion. As a result, it is possible to provide a precombustion-chamber fuel supply device for a precombustion-chamber gas engine having high reliability and low operation cost.

INDUSTRIAL APPLICABILITY

According to the present invention, it is possible to provide a precombustion-chamber fuel supply device for a gas engine that supplies fuel gas to a precombustion chamber of a precombustion-chamber type lean premixed gas engine in which a spark plug is used for ignition.

DESCRIPTION OF REFERENCE NUMERALS

1 Cylinder head
2 Precombustion-chamber cap
3 Nozzle
4 Precombustion chamber
5 Gas supply hole to precombustion chamber
6 Check valve
6s Check-valve insertion hole
9 Check-valve holder
10 Spark plug
12 Retainer
13 Spark-plug holder
14 Gas supply channel to precombustion chamber
14a Fuel inlet connector
14s Fuel-gas inlet part
23 Fuel-chamber electromagnetic valve
24 Fuel-gas supply source
28 Check-valve upper chamber
29 Check-valve lower chamber
30 Restricting portion
30a Orifice
60 Main chamber

The invention claimed is:

1. A precombustion-chamber fuel supply device for a gas internal combustion engine of a Miller-cycle type, comprising:
   a main chamber defined between a piston and a cylinder head of the gas internal combustion engine;
   a precombustion chamber which communicates with the main chamber via a nozzle and in which fuel gas is combusted by a spark plug;
   a gas supply channel to the precombustion chamber for supplying the fuel gas to the precombustion chamber;
   a fuel-gas supply source to discharge the fuel gas to the gas supply channel at a substantially atmospheric pressure;
   a precombustion-chamber electromagnetic valve disposed between the fuel-gas supply source and the gas supply channel; and
   a check valve disposed in the gas supply channel to the precombustion chamber to open due to a pressure decrease in the precombustion chamber at a bottom dead center of an intake stroke of a Miller cycle in which the piston closes an intake valve at a time corresponding to about 60 degrees to about 120 degrees in crank angle before the bottom dead center of the intake stroke so as to allow supply of the fuel gas to the precombustion chamber,
   wherein a fuel gas pressure of the gas supply channel to the precombustion chamber is not pressurized but is at a substantially atmospheric pressure from a timing of closing the intake valve to the bottom dead center of the intake stroke, and wherein the precombustion-chamber fuel supply device is to reduce a gas pressure of the precombustion chamber at the bottom dead center of the intake stroke to a negative pressure by closing the intake valve.

2. The precombustion-chamber fuel supply device for a gas internal combustion engine according to claim 1, wherein the check valve includes:

a check-valve body disposed in a check-valve insertion hole of the gas supply channel to the precombustion chamber so as to define a check-valve upper chamber and a check-valve lower chamber in the check-valve insertion hole, the check-valve body including a through hole penetrating from the check-valve upper chamber to the check-valve lower chamber inside the check-valve body and a seal portion formed on a periphery of an opening of the through hole adjacent to the check-valve lower chamber;

a valve body including a column portion fitted into the through hole, a valve-body top portion formed on an end of the column portion adjacent to a valve-body lower chamber, and a stopper portion formed on an end of the column portion adjacent to a valve-body upper chamber; and an elastic member which presses the valve-body top portion against the seal portion.

3. The precombustion-chamber fuel supply device for a gas internal combustion engine according to claim 2, wherein a pressing force W of the elastic member is within a range of a following expression (1):

$$Q2 \times Sa - Q1 \times Sb > W \qquad (1),$$

where Q1 is a gas pressure in the precombustion chamber at the bottom dead center in the intake stroke; Q2 is a fuel-gas pressure of the gas supply channel to the precombustion chamber; Sa is a fuel-gas pressure receiving area of the valve body; and Sb is the pre-combustion-chamber gas pressure receiving area of the valve body.

4. The precombustion-chamber fuel supply device for a gas internal combustion engine according to claim 1, wherein a fuel-gas pressure of the gas supply channel to the precombustion chamber is set to be lower than a gas pressure of the precombustion chamber in an exhaust stroke.

5. The precombustion-chamber fuel supply device for a gas internal combustion engine according to claim 2, wherein the check-valve body further includes a plurality of communication channels each of which communicates with the through hole in a vicinity of the check-valve lower chamber and has an opening toward the check-valve upper chamber, the plurality of communication channels being disposed on an outer side of an outer circumferential rim of the through hole.

6. The precombustion-chamber fuel supply device for a gas internal combustion engine according to claim 1, wherein the gas supply channel to the precombustion chamber includes a check-valve insertion hole in which the check-valve is disposed and a flow-channel space defined inside a fuel-inlet connector which extends in a direction orthogonal to a center line of the check-valve insertion hole, the fuel-inlet connector being connected to the gas supply source via the precombustion-chamber electromagnetic valve.

* * * * *